United States Patent
Bugatti

(10) Patent No.: US 8,424,837 B2
(45) Date of Patent: Apr. 23, 2013

(54) SHUT-OFF VALVE

(75) Inventor: Angelo Bugatti, Brescia (IT)

(73) Assignee: Valvosanitaria Bugatti S.p.A., Castegnato (IT)

( * ) Notice: Subject to any disclaimer, the term of this patent is extended or adjusted under 35 U.S.C. 154(b) by 413 days.

(21) Appl. No.: 12/725,505

(22) Filed: Mar. 17, 2010

(65) Prior Publication Data
US 2011/0198529 A1 Aug. 18, 2011

(30) Foreign Application Priority Data
Feb. 16, 2010 (IT) .............................. BS2010A0030

(51) Int. Cl.
*F16K 35/02* (2006.01)
(52) U.S. Cl.
USPC ........................... 251/96; 251/288; 251/315.1
(58) Field of Classification Search ............ 251/95–97, 251/284–288, 315.01, 315.1
See application file for complete search history.

(56) References Cited

U.S. PATENT DOCUMENTS

| | | | | |
|---|---|---|---|---|
| 1,933,177 A * | 10/1933 | Kindl | ................ | 251/96 |
| 2,064,623 A * | 12/1936 | Mueller | ................ | 251/96 |
| 2,652,226 A * | 9/1953 | Huff | ................ | 251/96 |
| 3,292,660 A * | 12/1966 | Zarybnicky | ........ | 137/599.17 |
| 3,764,102 A * | 10/1973 | Shopsky | ............ | 251/96 |
| 4,137,945 A * | 2/1979 | Cutts | ........... | 137/625.46 |
| 5,188,335 A * | 2/1993 | Pettinaroli | ........ | 251/95 |
| 7,178,781 B2 * | 2/2007 | Trappa | ............ | 251/96 |

* cited by examiner

*Primary Examiner* — John Bastianelli
(74) *Attorney, Agent, or Firm* — Kilyk & Bowersox, P.L.L.C.

(57) ABSTRACT

Shut-off valve of a fluid having a valve body (20), an obturator (5) housed in the valve body and rotatable around a rotation axis (X), and a command organ (2) connected to the obturator (5) by means of a command stem (12) which extends in an aperture made in a cylindrical projection (21) of the valve body (20).

8 Claims, 5 Drawing Sheets

SHUT-OFF VALVE

FIELD OF THE INVENTION

The present invention refers to a shut-off valve for a fluid, of the type comprising a valve body in which an entry passage and an exit passage for the fluid are provided, an obturator housed in a seat made in the valve body between said passages and rotatable around an axis at least between an open position and a closed position of the valve, and a command organ operatively connected to the obturator to command its rotation by a user. Specifically, the invention relates to a valve of the type described above provided, in addition, with means for opening and/or closing the same in safety.

The opening and/or closing of the valve in safety is understood to mean that when the obturator is in the open or closed position of the valve, such position cannot be modified inadvertently or unintentionally, but requires a sequence of at least two movements, therefore implying a specific intention to perform such manoeuvre.

PRIOR ART DESCRIPTION

Shut-off valves with safety devices preventing accidental manoeuvre of the obturator are already known of in the art, but such devices entail the presence of a certain number of additional components which add to the difficulty and assembly time of the valve, its production and storage costs, and reduce its reliability.

One example of such valve is described in US 2004238770 A1.

SUMMARY OF THE INVENTION

The purpose of the invention is therefore to propose a shut-off valve suitable for preventing accidental manoeuvring of its command organ, having an alternative structure to the known valves, which is particularly reliable and safe as well as economical to produce.

Such purpose is achieved by a shut-off valve according to claim 1.

BRIEF DESCRIPTION OF THE DRAWINGS

The features and advantages of the invention will be evident from the description below, made by way of a non-limiting example, in accordance with the attached drawings, wherein.

DETAILED DESCRIPTION OF THE INVENTION

Figure 1:
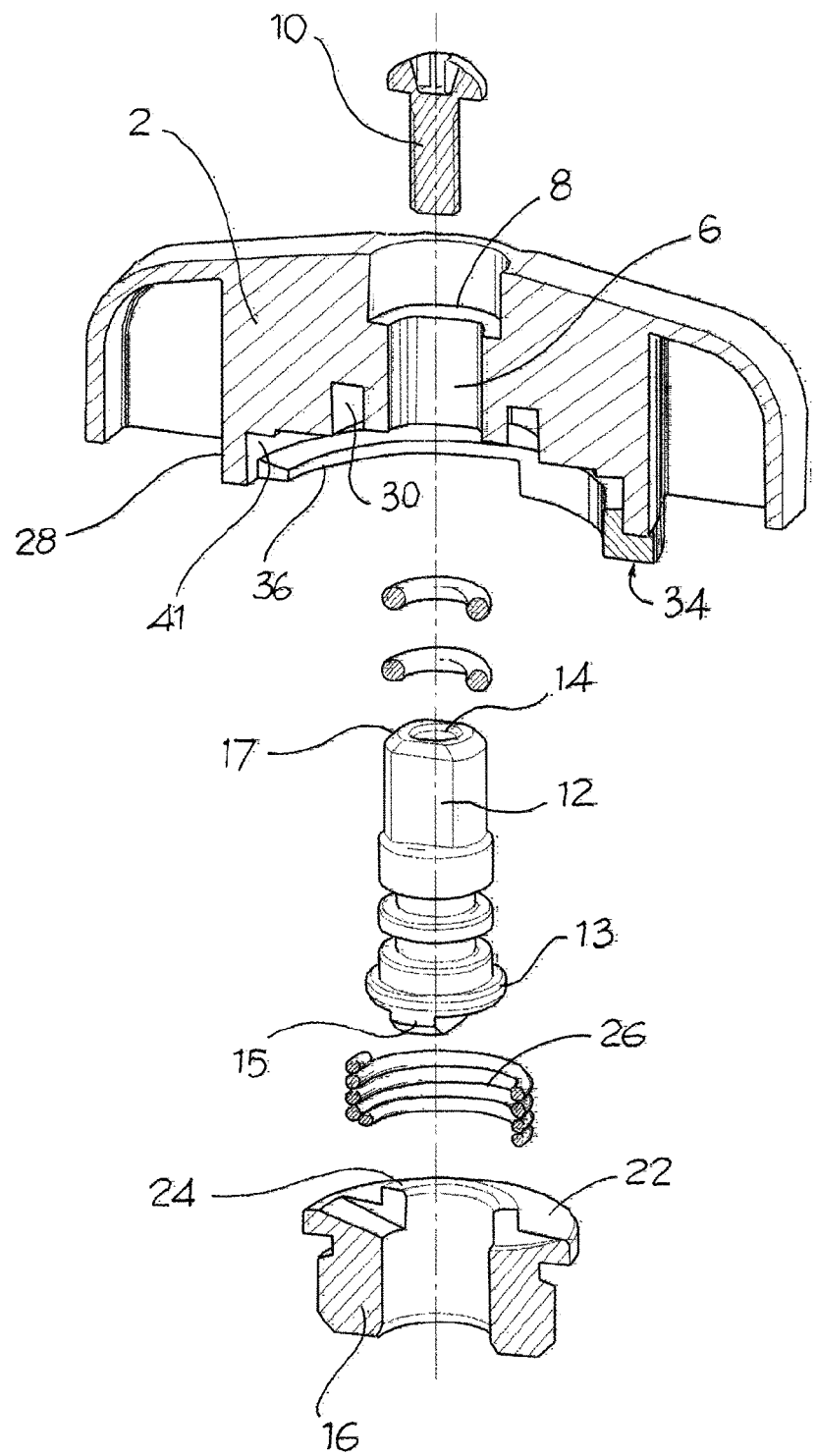
FIG. 1 shows an exploded perspective view of the command elements of the shut-off valve according to the invention.
Figure 2A:
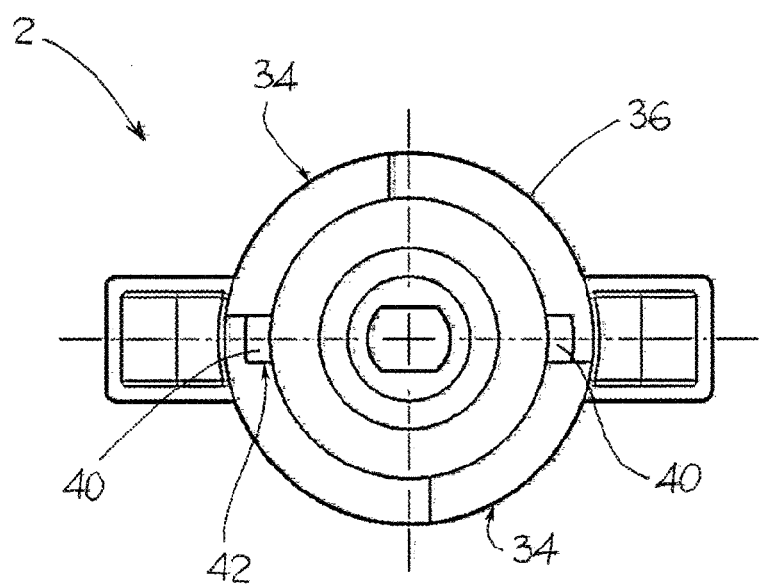
FIGS. 2a and 2b are, respectively, a plan view from below and an elevated view of the command organ according to one embodiment.
Figure 2B:
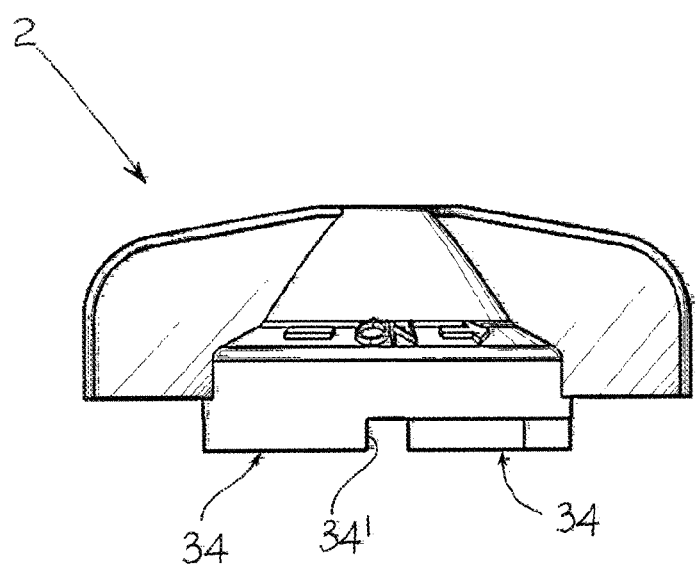
Figure 3:
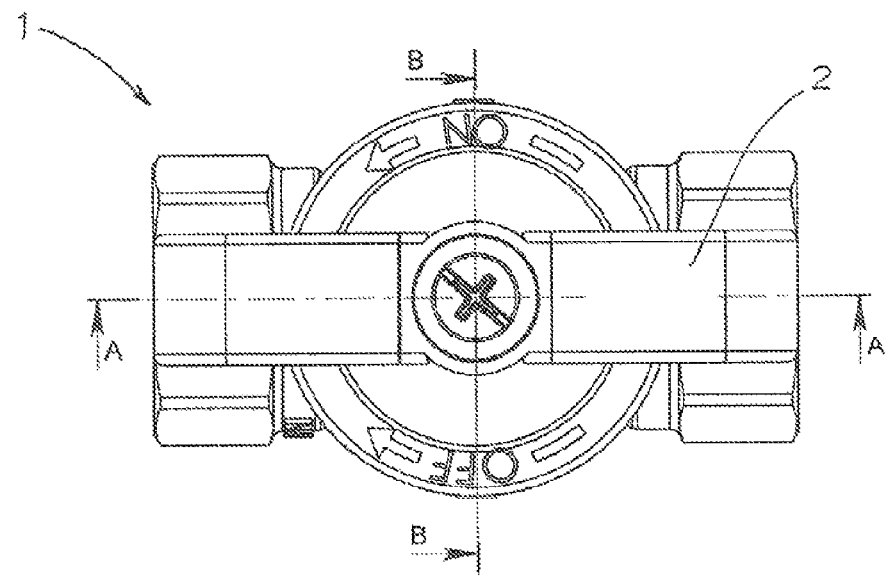
FIGS. 3, 3a and 3b are, respectively, a plan view, a transversal section and a longitudinal section of the valve when it is open.
Figure 4:
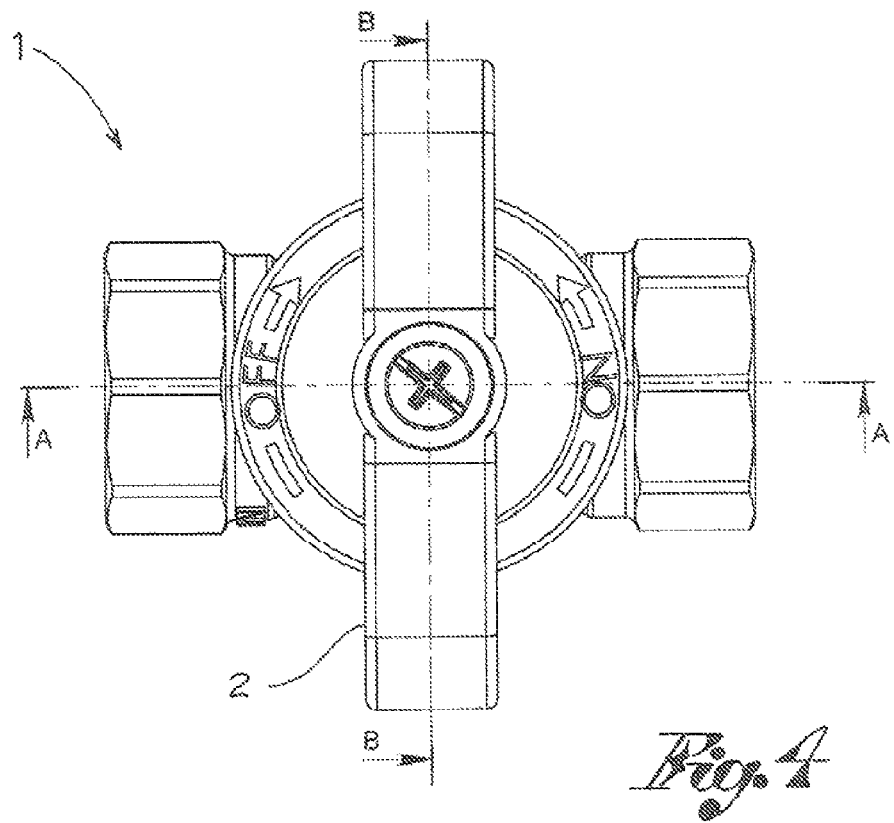
FIGS. 4, 4a and 4b are, respectively, a plan view, a transversal section and a longitudinal section of the valve when it is closed.
Figure 3A:
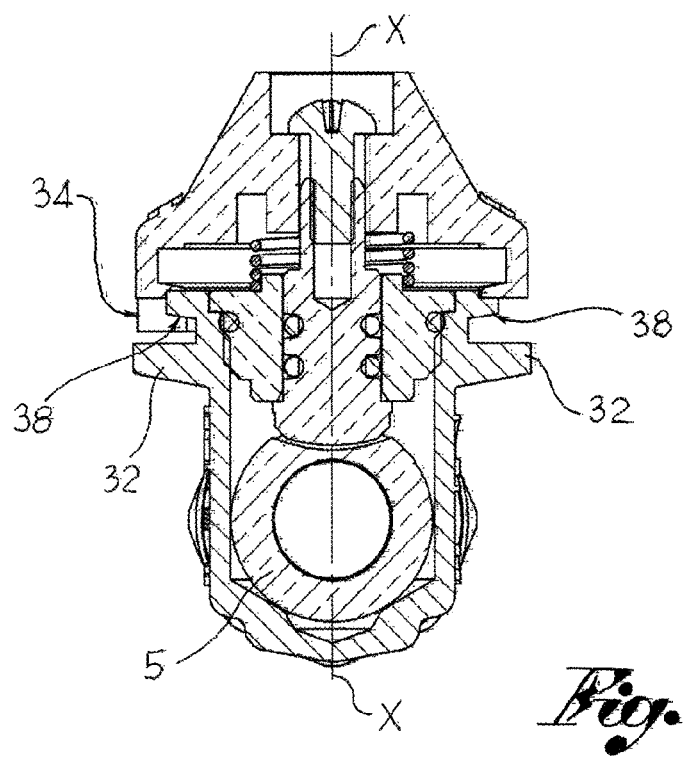
Figure 3B:
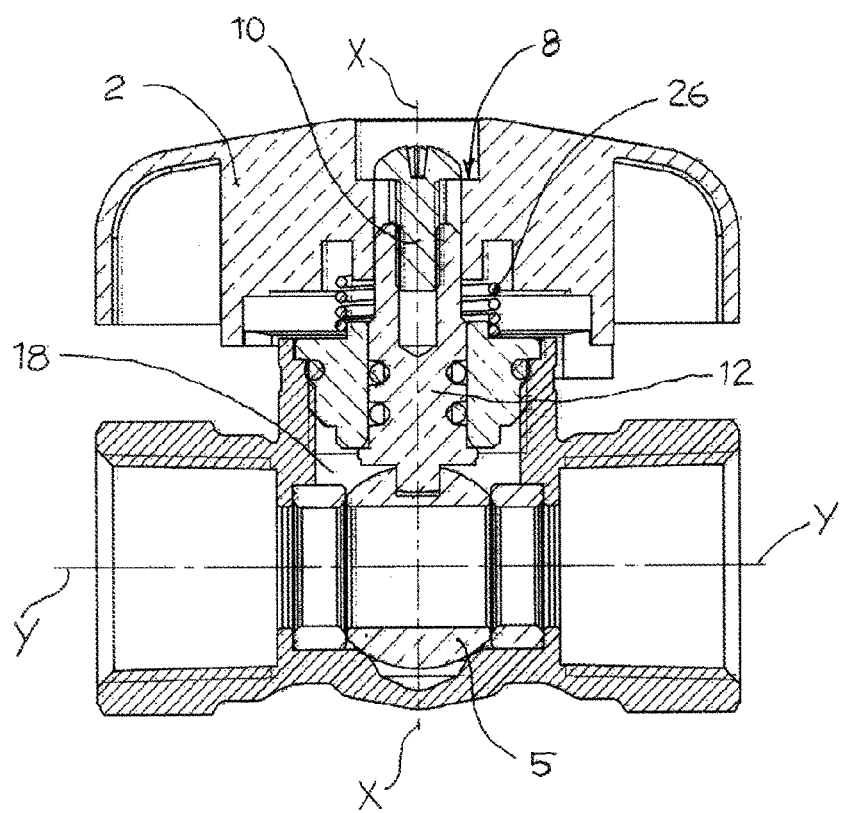
Figure 4A:
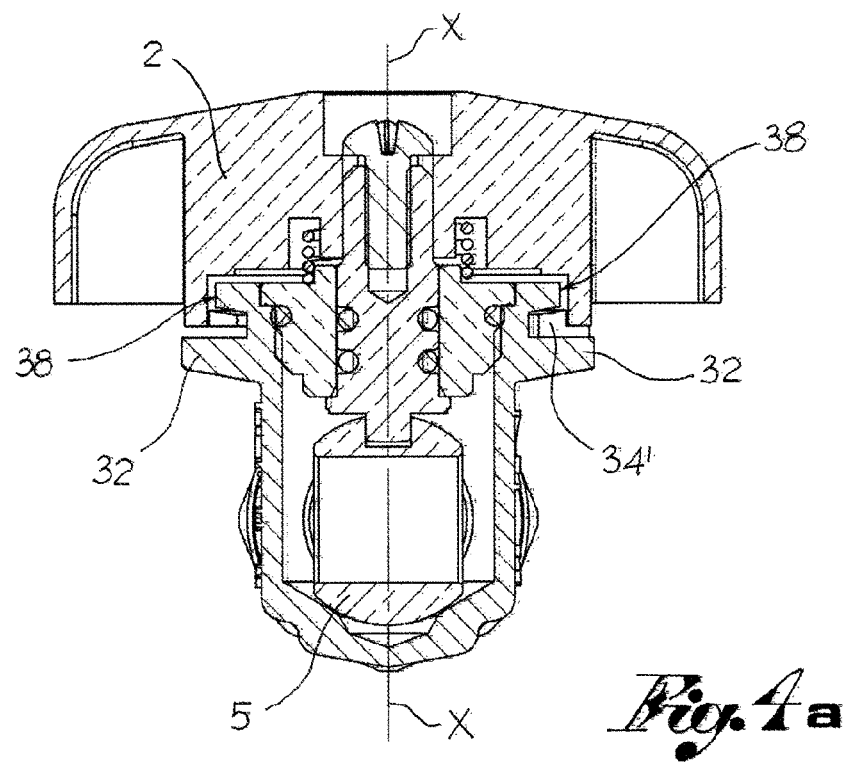
Figure 4B:
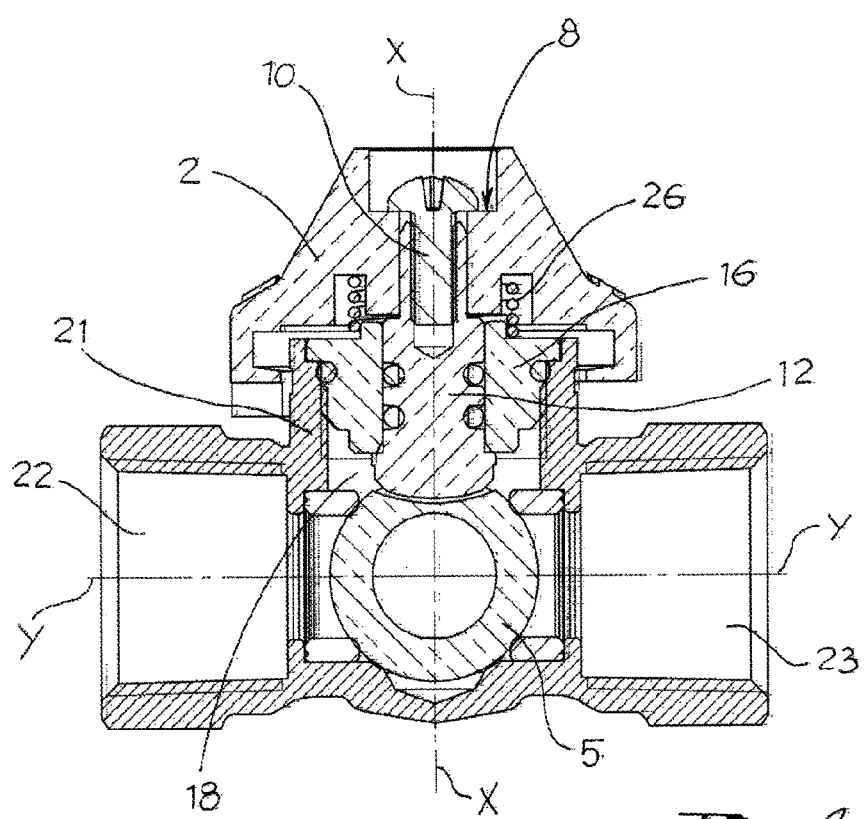

With reference to the attached drawings, reference numeral 1 globally denotes a shut-off valve according to the present invention.

The valve 1 comprises a valve body 20 defining at least one entry passage 22 and at least one exit passage 23 for a fluid. For example, said entry 22 and exit passages 23 are aligned along an axis Y. Between said passages there is a seat 60 in the valve body 20 which an obturator 5 is housed in. Said obturator 5 is rotatable around an axis X, for example orthogonal to the axis Y identifying the direction of flow of the fluid, at least between an open position of the valve, placing the entry 22 and exit passages 23 in fluidic communication, and a closed position of the valve, in which it intercepts and stops the fluid coming from the entry passage 22.

In a preferred embodiment, said obturator 5 is a spherical obturator.

The valve 1 comprises a command organ 2 operatively connected to the obturator 5 to allow the rotation of this by a user. For example said command organ 2 is a butterfly lever.

In one embodiment, the command organ 2 is connected to the obturator 5 by means of a command stem 12. More in detail, said command stem 12 comprises a lower end 15 coupling to the obturator 5, for example via a geometric or shaped coupling, and an opposite upper end 17 which protrudes from an aperture 18 made in a cylindrical projection 21 of the valve body 20 for connection to the command organ 2.

In one embodiment, the command organ 2 is centrally traversed by an axial hole 6 for the passage and housing of a screw 10 in a threaded hole 14 made in the command stem 12; in said axial hole 6 a shoulder 8 is formed in order to block the race of the screw 10 during screwing.

In one embodiment, in the aperture 18 of the cylindrical projection 21 of the valve body a ring nut 16 is inserted which rotatably supports the command stem 12, preventing extraction of the latter from the valve body thanks to the presence of a shoulder 13 made, for example, at the base of the stem.

The ring nut 16, as said, is suitable for supporting the stem 12 at the same time hermetically plugging the cylindrical aperture 18 of the valve body.

The command organ 2 comprises a cylindrical portion 28 which overlaps at least partially the outer lateral surface of the cylindrical projection 21 of the valve body.

From said outer lateral surface of the cylindrical projection of the valve body at least one blocking tooth 38 extends radially. Distanced in height along the main axis of the cylindrical portion 28 of the command organ 2, on the inner side, an annular recess 41, suitable for housing the blocking tooth 38 so as to allow the rotation of the command organ 2 around the cylindrical portion 21 of the valve body, and a counter-blocking tooth 42, suitable for angularly engaging the blocking tooth 38 so as to block rotation of the command organ 2, are provided.

The command organ 2 is therefore axially movable in relation to the cylindrical projection 21 between an operative position, in which the blocking tooth 38 is positioned in the annular recess 41 of the cylindrical portion 28, and a blocking position, in which the blocking tooth 38 engages against the counter-blocking tooth 42.

In one embodiment, the counter-blocking tooth 42 is made in the rim 36 defining the cylindrical portion 28 on the side facing the valve body 20. In this embodiment, therefore, the operative position of the command organ 2 corresponds to a lowered position (considering for example the command organ facing upwards in relation to the valve body) or position close to the valve body, while the blocking position corresponds to a raised or distant position from the valve body.

In one embodiment, in the lateral wall of the cylindrical portion 28 of the command organ 2 at least one axial split 40 of a width at least equal to that of the blocking tooth 38 is formed and communicates with the annular recess 41. Such axial split 40 thereby consents, when the blocking tooth 38 finds itself therein, the axial movement of the command organ between the lowered and the raised position. Advantageously, following the axial movement of the command organ, the blocking tooth 38 moves from the annular recess 41 to inside the axial split 40, and vice versa. In such embodiment therefore the counter-blocking tooth 42 is defined by the longitudinal walls defining the axial split 40, so that, when the command organ is in the blocked position, the blocking tooth 38 finds itself inside the axial split 40 and is angularly engaged by said longitudinal walls. The command organ is thereby prevented from rotating.

In the preferred embodiment illustrated in the drawings, the annular recess 41 is defined, on the side facing the valve body, by a base wall 36 which substantially extends in a radial direction, at least one axial split 40 being made in said base wall 36 to block the command organ in the closed or open position of the valve. By making, for example, two axial splits 40 angularly distanced by 90° in the lateral wall of the cylindrical portion of the command organ, the latter is blocked in both the open and closed positions of the valve.

According to a preferred embodiment, the command organ is biased by elastic means 26 to remain and return to the axial blocking position, for example in a raised position in relation to the valve body. Advantageously, said elastic means 26 comprise a spring inserted between the ring nut 16 and the inner apex of the cylindrical portion 28 of the command organ 2. More in detail, from the outer or upper surface 22 of the ring nut 16 a circular projection 24 rises. acting as a guide and support element for one end of the spring; the opposite end of the spring is inserted in a special circular seat 30 made on the command element 2.

Consequently, starting from the open or closed position of the valve, wherein at least one blocking tooth 38, or pair of diametrically opposed blocking teeth, is/are in a respective axial split 40, in order to be able to turn the command organ 2 said axial direction organ must first be shifted, overcoming the force of the spring, so as to bring the blocking tooth 38 to the height of the annular recess 41, in which it is free to move.

In a further advantageous embodiment, the valve body 20 and the command organ 2 are provided with arrest means suitable for cooperating with each other so as to stop the rotation of the command organ in the two limit stop positions, of valve open or valve closed.

In one embodiment, said means of arrest comprise a pair of radial bosses 32, diametrically opposite each other, which extend from the lateral wall of the cylindrical projection 21 of the valve body, and at least one circular sector 34, for example being of equal breadth to a quarter of the circumference, which extends from the base wall 36 of the command organ, towards the valve body. The surfaces 34' angularly defining said circular sector 34 alternatively push against the radial bosses 32 of the valve body stopping the rotation of the command organ in the two limit stop positions.

To turn the command organ the user therefore needs to overcome the force of the spring 26 so as to move the blocking tooth 38 from the axial split 40 to the annular recess 41, and while maintaining such pressure (or traction in the case of raising the command organ) to turn the command element 2. The command element 2 is free to rotate until the circular sector 34 abuts against one of the radial bosses 32 of the valve body.

The valve according to the invention thereby makes it possible to achieve safe positioning of the obturator in a closed and/or open position, preventing accidental shifting thanks to the need to perform a dual movement of the obturator, first axial and then angular.

Consequently it is unlikely that the valve which the invention relates to should be moved inadvertently.

Advantageously, the valve which the invention relates to cannot be easily moved by a child either.

Advantageously, the valve which the invention relates to is simple to produce and assemble.

Advantageously, the valve which the invention relates to may have any type of command element, such as a lever rather than a butterfly as shown in the drawings.

Advantageously, the valve which the invention relates to has been designed so as to be practicable on all types of valve, whatever the method of interception or shape.

It is clear that a person skilled in the art may make modifications to the shut-off valve described above, so as to satisfy contingent requirements, while remaining within the scope of protection as defined by the following claims.

For example, in an entirely equivalent manner, the annular recess and the axial split or splits may be made in the cylindrical projection of the valve body, while the blocking tooth extends towards the inside of the cylindrical portion of the command organ.

What is claimed is:

1. A shut-off valve of a fluid comprising a valve body defining at least one entry passage and at least one exit passage for a fluid, an obturator housed in said valve body and rotatable around a rotation axis, a command organ operatively connected to the obturator by means of a command stem which extends in an aperture made in a cylindrical projection of the valve body, wherein the command organ comprises a cylindrical portion which overlaps at least partially the outer lateral surface of said cylindrical projection of the valve body, wherein from said outer lateral surface of the cylindrical projection of the valve body at least one blocking tooth extends radially, and wherein, on the inner side of the cylindrical portion of the command organ, an annular recess able to house the blocking tooth so as to allow the rotation of the command organ around the cylindrical portion of the valve body, and a counter-blocking tooth able to angularly engage the blocking tooth so as to block the rotation of the command organ are provided reciprocally distanced in height along the main axis of the cylindrical portion, the command organ being axially movable in relation to the cylindrical projection between an operative position, wherein the blocking tooth is located in the annular recess of the cylindrical portion, and a blocked position, wherein the blocking tooth engages the counter-blocking tooth, wherein a ring nut is inserted in the cylindrical projection of the valve body to guide and support the command stem, and said shut-off valve includes elastic means that comprise a spring inserted between the ring nut and the inner apex of the cylindrical portion of the command organ.

2. A shut-off valve according to claim 1, wherein the counter-blocking tooth is formed in a rim defining the cylindrical portion on the side facing the valve body.

3. A shut-off valve according to claim 1, wherein in the lateral wall of the cylindrical portion of the command organ at least one axial split of a width at least equal to that of the blocking tooth is provided, said axial split communicating with the annular recess, said axial split, when the blocking tooth is located in the axial split, allows axial movement of the command organ between the lowered and raised position.

4. A shut-off valve according to claim 3, wherein the annular recess is defined, on the side facing the valve body, by a base wall which substantially extends in a radial direction, said at least one axial split being formed in said base wall to block the command organ in a closed or open position of the valve.

5. A shut-off valve according to claim 1, wherein the command organ is biased by elastic means to remain and return to the axial blocking position.

6. A shut-off valve according to claim 1, wherein the valve body and the command organ are provided with arrest means suitable for cooperating with each other so as to stop the rotation of the command organ in the two limit stop positions, of valve open or valve closed.

7. A shut-off valve according to claim 6, wherein said arrest means comprise a pair of radial bosses, diametrically opposite each other, which extend from the lateral wall of the cylindrical projection of the valve body, and at least one circular sector.

8. A shut-off valve according to claim 6, wherein said arrest means comprise a pair of radial bosses, diametrically opposite each other, which extend from the lateral wall of the cylindrical projection of the valve body, and at least one circular sector of a breadth equal to a quarter of the circumference, which extends from the base wall of the command organ, towards the valve body, the surfaces angularly defining said circular sector being suitable to alternatively push against the radial bosses of the valve body stopping the rotation of the command organ in the two limit stop positions.

* * * * *